(12) United States Patent
Li et al.

(10) Patent No.: US 11,799,161 B2
(45) Date of Patent: Oct. 24, 2023

(54) BATTERY PACK AND POWER CONSUMING DEVICE

(71) Applicant: CONTEMPORARY AMPEREX TECHNOLOGY CO., LIMITED, Ningde (CN)

(72) Inventors: Quanguo Li, Ningde (CN); Qian Liu, Ningde (CN); Yonghuang Ye, Ningde (CN); Fajun Huang, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/818,407

(22) Filed: Aug. 9, 2022

(65) Prior Publication Data

US 2023/0086688 A1   Mar. 23, 2023

Related U.S. Application Data

(63) Continuation of application No. PCT/CN2021/119468, filed on Sep. 18, 2021.

(51) Int. Cl.
*H01M 50/209* (2021.01)
*H01M 50/267* (2021.01)

(52) U.S. Cl.
CPC ....... *H01M 50/209* (2021.01); *H01M 50/267* (2021.01)

(58) Field of Classification Search
CPC .................................................. H01M 50/209
See application file for complete search history.

(56) References Cited

U.S. PATENT DOCUMENTS

| | | | | |
|---|---|---|---|---|
| 8,021,773 | B1 * | 9/2011 | Simon | ................. H01M 10/486 429/61 |
| 2020/0130511 | A1 * | 4/2020 | Botts | ..................... H01M 4/485 |

FOREIGN PATENT DOCUMENTS

| | | | |
|---|---|---|---|
| CN | 103326084 | A | 9/2013 |
| CN | 107275714 | A | 10/2017 |
| CN | 111446488 | A | 7/2020 |
| JP | 2013211980 | A | 10/2013 |
| WO | WO-2021073723 A1 * | 4/2021 | ................ H02J 1/10 |

OTHER PUBLICATIONS

International Search Report of application No. PCT/CN2021/119468, dated Apr. 23, 2022.
Written Opinion of application No. PCT/CN2021/119468, dated Apr. 23, 2022.

* cited by examiner

*Primary Examiner* — Jonathan G Jelsma
(74) *Attorney, Agent, or Firm* — Ladas & Parry LLP

(57) ABSTRACT

The present application provides a battery pack and a power consuming device powered by the battery pack. The battery pack includes a battery pack cavity and a plurality of battery cells received in the battery pack cavity. An interior space of the battery pack cavity can be divided into a first region with a temperature change rate of K1 and a second region with a temperature change rate of K2, where $0.066 \leq K1 \leq 0.131$ and $0.034 \leq K2 \leq 0.066$, K1 and K2 being expressed in °C./min. The plurality of battery cells include at least one first battery cell arranged in the first region, and at least one second battery cell arranged in the second region. The battery pack of the present application can reduce or avoid the cask effect at low temperature and improve the energy retention rate at low temperature.

14 Claims, 3 Drawing Sheets

BATTERY PACK AND POWER CONSUMING DEVICE

CROSS REFERENCE TO RELATED APPLICATION

This application is a continuation of International Patent Application No. PCT/CN2021/119468, filed on Sep. 18, 2021, which is incorporated by reference in its entirety.

TECHNICAL FIELD

The present application relates to the technical field of lithium batteries, and in particular, to a battery pack with high energy retention rate at low temperature and a power consuming device comprising the battery pack.

BACKGROUND

In recent years, with the continuous development of lithium-ion battery technology, lithium-ion batteries are widely used in energy storage power systems such as hydroelectric, thermal, wind and solar power plants, as well as electric tools, electric bicycles, electric motorcycles, electric vehicles, military equipment, aerospace and other fields.

At present, the energy storage batteries in electric vehicles are mainly battery packs composed of lithium-ion secondary batteries. The lithium-ion secondary batteries used in the battery pack mainly include lithium iron phosphate batteries, lithium manganate batteries, lithium cobalt oxide batteries, and ternary batteries containing nickel, cobalt, and manganese elements.

However, the energy retention rate of the battery pack composed of lithium-ion secondary batteries, which is used as an energy storage battery for an electric vehicle, is greatly reduced during winter use, resulting in a serious reduction in the endurance mileage of the electric vehicle. This has become a common problem in the industry. How to improve the endurance mileage of electric vehicles in winter has become a key issue that needs to be solved urgently in the current period of time. Therefore, the energy retention rate at low temperature of existing battery packs composed of lithium-ion secondary batteries still needs to be improved.

SUMMARY

The present application is made in view of the above-mentioned technical problems, and the objective thereof is to provide a battery pack composed of lithium-ion secondary batteries with excellent energy retention at low temperature and improved endurance at low temperature, and a power consuming device comprising the battery pack.

In order to achieve the above-mentioned objective, a first aspect of the present application provides a battery pack comprising a battery pack cavity and a plurality of battery cells received in the battery pack cavity, where an interior space of the battery pack cavity can be divided into a first region with a temperature change rate of K1 and a second region with a temperature change rate of K2, where $0.066 \leq K1 \leq 0.131$ and $0.034 \leq K2 \leq 0.066$, K1 and K2 being expressed in °C./min; the plurality of battery cells comprises: at least one first battery cell arranged in the first region; and at least one second battery cell arranged in the second region; and the full discharge energies of the first battery cell and the second battery cell when standing at 25° C. are $E_1$ and $E_2$ respectively and the full discharge energies of the first battery cell and the second battery cell when standing at −20° C. are $E_1'$ and $E_2'$ respectively, where $1 < E_1/E_2 \leq 1.5$, and $0.95 \leq E_1'/E_2' \leq 1.67$, $E_1$, $E_2$, $E_1'$, and $E_2'$ being expressed in Wh (Watt·hour).

Thereby, in the present application, according to the different rates of temperature change, the interior space of the battery pack cavity is divided into a first region with a large temperature change rate (e.g., the outermost region in the interior space of the battery pack cavity) and a second region with a small temperature change rate (e.g., a region in the interior space of the battery pack cavity that is located at the inner side relative to the outermost region), such that the low-temperature performance of the first battery cell arranged in the first region is superior to the low-temperature performance of the second battery cell arranged in the second region, that is, the relationship of $1 < E_1/E_2 \leq 1.5$ and $0.95 \leq E_1'/E_2' \leq 1.67$ is satisfied.

In this way, the energy exerted at low temperature by the battery cells in the regions with different temperature change rates of the battery pack can be made substantially identical, the cask effect of the battery pack at low temperature can be avoided, and the overall energy retention rate of the battery pack at low temperature is improved.

In a preferred embodiment, $1.05 \leq E_1/E_2 \leq 1.45$ and $0.97 \leq E_1'/E_2' \leq 1.41$.

Thereby, the energy exerted by the first battery cell at low temperature can be made closer to the energy exerted by the second battery cell, and the overall energy retention rate of the battery pack at low temperature is further improved.

In any embodiment, $E_1'/E_1$ is 70% to 95% and $E_2'/E_2$ is 65% to 97%.

Thereby, the first battery cell and the second battery cell each have a high energy retention rate at low temperature, and the battery pack can easily maintain a high energy retention rate at low temperature as a whole.

In a preferred embodiment, $E_1'/E_1$ is 74% to 90% and $E_2'/E_2$ is 70% to 85%.

Thereby, the first battery cell and the second battery cell each have a higher energy retention rate at low temperature, and the battery pack can easily maintain a higher energy retention rate at low temperature as a whole.

In any embodiment, the number of the first battery cells in the first region accounts for 10% or more of the total number of battery cells in the first region, optionally 30% or more, further optionally 50% or more, and more further optionally 80% or more.

By allowing the number of the first battery cells with superior low-temperature performance in the first region to account for 10% or more of the total number of battery cells in the first region, the effect of improving the overall energy retention rate of the battery pack at low temperature can be obtained. The higher the proportion by number of first battery cells in the first region, the better the above effect, but the higher the cost. Within the range in which the objective of the present application can be achieved, by allowing the ratio of the number of first battery cells in the first region to the total number of battery cells in the first region being in an appropriate range, the low-temperature performance and cost of the battery pack can be balanced.

In any embodiment, the number of the second battery cells in the second region accounts for 50% or more of the total number of battery cells in the second region, further optionally 80% or more.

By allowing the number of the second battery cells with ordinary low-temperature performance in the second region to account for 50% or more of the total number of battery cells in the second region, the effects of improving the consistency of the batteries in the second region, avoiding the reduction of the available energy density of the battery pack at normal temperature, and reducing the control cost of the power management system can be obtained.

In any embodiment, the first region is located at the outermost side in the interior space of the battery pack cavity, and the second region is located at the inner side in the battery pack cavity relative to the first region.

Generally, without auxiliary heating of the interior space of the battery pack cavity using a heating component such as a heating plate, a region located at the outermost side in the interior space of the battery pack cavity is relatively large in temperature change rate and relatively low in temperature, namely, equivalent to the first region, and a region located at the inner side in the battery pack cavity relative to the first region is relatively small in temperature change rate and relatively high in temperature, namely, equivalent to the second region.

In any embodiment, the ratio of the volume of the first region to the volume of the interior space of the battery pack cavity is 50% or less, optionally 40% or less, and further optionally 30% or less.

As described above, the first battery cell arranged in the first region has better low-temperature performance but higher cost, and thus, by allowing the ratio of the volume of the first region to the volume of the interior space of the battery pack cavity to be within an appropriate range, significant increase in cost due to use of the first battery cell can be suppressed.

In any embodiment, the first battery cell and the second battery cell are battery cells of the same chemical system with the same positive electrode material, negative electrode material and electrolyte.

Thereby, the first battery cell and the second battery cell can be manufactured by adjusting the composition of at least one of the positive electrode material, the negative electrode material, and the electrolyte, and thus, the first battery cell and the second battery cell having different low-temperature performances can be easily manufactured.

In any embodiment, the first battery cell and the second battery cell are ternary batteries, lithium manganate batteries, lithium iron phosphate batteries, sodium ion batteries or lithium metal batteries.

Thereby, within the range in which the above-mentioned relationship of $E_1/E_2$ and $E_1'/E_2'$ is satisfied, existing lithium-ion batteries can be used as the first battery cell and the second battery cells so that the first battery cell and the second battery cell have a high degree of freedom of selection.

In any embodiment, the first battery cell and the second battery cell are battery cells of different chemical systems in which at least one of a positive electrode material, a negative electrode material and an electrolyte is different.

Different chemical systems means that at least one of a positive electrode material, a negative electrode material and an electrolyte is different. By using battery cells of different chemical systems for the first battery cell and the second battery cell, a battery pack can be manufactured by combining existing battery cells of different chemical systems, and the degree of freedom in manufacturing the battery pack is high.

In any embodiment, the positive electrode active material of the first battery cell is different from the positive electrode active material of the second battery cell, and the gram capacity of the positive electrode active material of the first battery cell is 1.2 to 1.5 times the gram capacity of the positive electrode active material of the second battery cell.

Thereby, the capacity of the first battery cell can be increased without significantly increasing the volume of the first battery cell, and the assembly of the battery pack can be facilitated.

In any embodiment, the first battery cell is a ternary battery, and the second battery cell is a lithium manganate battery or a lithium iron phosphate battery.

Generally, a ternary battery has better low-temperature performance compared with a lithium manganate battery or a lithium iron phosphate battery, and thus, the first battery cell can use a ternary battery, and the second battery cell can use a lithium manganate battery or a lithium iron phosphate battery. Thereby, the battery pack of the present application can be easily manufactured using existing battery cells.

A second aspect of the present application provides a power consuming device comprising the battery pack of the first aspect of the present application.

Thereby, the power consuming device of the second aspect of the present application has a strong endurance at low temperature, and can be used normally for a long time even at low temperature.

By adopting the solutions of the present application, it is possible to provide a battery pack for which that the energy released by the battery cells in regions with different temperature change rates at low temperature can be made substantially identical, the cask effect at low temperature can be avoided, and the overall energy retention rate at low temperature can be improved, and a power consuming device comprising the battery pack.

LIST OF REFERENCE NUMERALS

Figure 1:
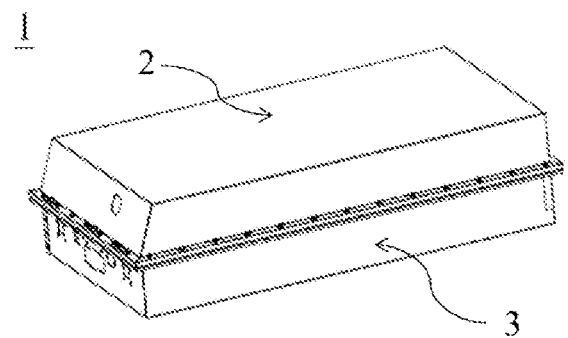
FIG. 1 is a schematic diagram of the overall structure of a battery pack in an embodiment of the present application after assembly.

1—battery pack;
2—upper box body;
3—lower box body;
5—first battery cell;
6—second battery cell;
R1—first region;
R2—second region;
51—housing;
52—electrode assembly;
53—top cover assembly.

DETAILED DESCRIPTION

Hereafter, embodiments of the battery pack and power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed herein are defined in the form of lower and upper limits, where a given range is defined by the selection of a lower limit and an upper limit, and the selected lower and upper limits define the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it is to be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of these numerical combinations. In addition, when a parameter is expressed as an integer of ≥2, it is equivalent to disclose that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

At present, from the perspective of the development of the market form, the application of power batteries is more and more extensive. Power batteries are not only used in energy storage power systems such as hydroelectric, thermal, wind and solar power plants, but also widely used in electric communication facilities such as electric bicycles, electric motorcycles, and electric vehicles, as well as military equipment and aerospace and other fields. With the continuous expansion of the application field of power batteries, the market demand thereof is also constantly expanding.

The inventors have noticed that a battery pack composed of lithium-ion secondary batteries that is commonly used in electric vehicles releases less energy at low temperatures than at normal temperature due to reduced electrolyte solution fluidity and low lithium-ion activity and migration rate in the batteries. Further, the outermost part of the battery pack is more likely to exchange heat with the external environment, and thus, the outermost part of the battery pack has a lower temperature than the central part of the battery pack, as well as lower electrolyte solution fluidity, lithium-ion activity and migration rate. Therefore, when the same battery cells are used in the battery pack, at low temperature, the energy that the battery cell located at the outermost part of the battery pack can exert is less than the energy that the battery cell located in the central part of the battery pack can exert. A battery pack is a system in which all battery cells are connected in series or in parallel. Therefore, the power that the system can release can only be based on the battery cell that releases the least energy, otherwise it will lead to over-discharge of the battery cell with low energy exertion rate.

Then, the inventors have thought that by increasing the available energy of the battery cell with the smallest energy exertion rate in the battery pack in a low temperature environment, and compensating for the cask effect of the battery pack, the overall energy exertion of the battery pack in a low temperature environment can be improved, thereby improving the endurance mileage of an electric vehicle using the battery pack in a low temperature environment.

In order to achieve the above-mentioned objective, the inventors of the present application have conducted repeated studies, and as a result, have found that by arranging two or more battery cells with different low-temperature performances according to the temperature distribution in the interior space of the battery pack cavity, namely, arranging the battery cell with higher low-temperature performance in a region with a large temperature change rate in the interior space of the battery pack cavity (e.g., the outermost region in the battery pack cavity) and arranging the battery cell with lower low-temperature performance in a region with a small temperature change rate in the battery pack cavity (e.g., a region in the battery pack cavity that is located at the inner side relative to the outermost region), the energy exerted at low temperature by the battery cells in the regions with different temperature change rates of the battery pack can be made substantially identical, the cask effect of the battery pack at low temperature can be avoided, and the overall energy retention rate of the battery pack at low temperature is improved, thereby improving the endurance mileage of a power consuming device such as an electric vehicle using the battery pack as a power supply at low temperature.

Battery Pack

Next, a battery pack 1 of the present application will be specifically described.

Figure 2:
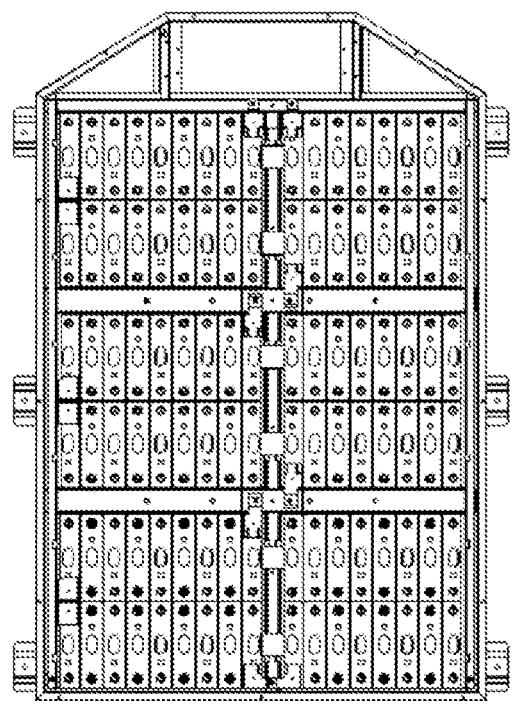
FIG. 2 is a schematic top view of the structure of the battery pack shown in FIG. 1 in an embodiment of the present application after removal of a box body.

The battery pack 1 of the present application, as shown in FIGS. 1 and 2, comprises a battery case and a plurality of battery cells arranged in the battery case. The battery box comprises an upper box body 2 and a lower box body 3. The upper box body 2 can cover the lower box body 3 and a closed space for accommodating a plurality of battery cells, namely, a battery pack cavity is formed.

Figure 3:
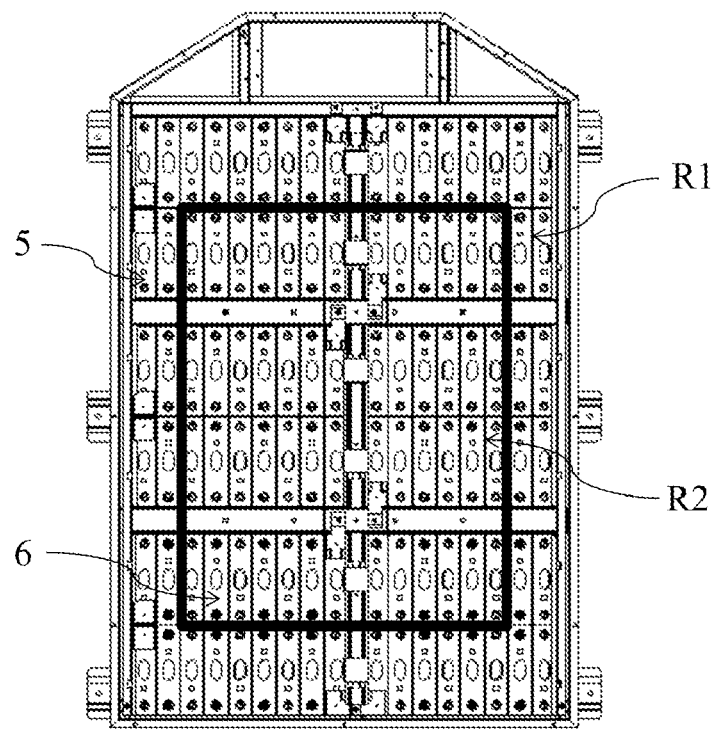
FIG. 3 is a schematic diagram indicating a division of a first region and a second region in the interior space of a battery pack cavity in an embodiment of the present application.

In one embodiment of the present application, as shown in FIG. 3, the battery pack 1 comprises a battery pack cavity and a plurality of battery cells 5, 6 received in the battery pack cavity, where an interior space of the battery pack cavity can be divided into a first region R1 with a temperature change rate of K1 and a second region R2 with a temperature change rate of K2, where 0.066≤K1≤0.131 and 0.034≤K2≤0.066, K1 and K2 being expressed in ° C./min; the plurality of battery cells 5, 6 comprises: at least one first battery cell 5 arranged in the first region R1; and at least one second battery cell 6 arranged in the second region R2; and the full discharge energies of the first battery cell 5 and the second battery cell 6 when standing at 25° C. are $E_1$ and $E_2$ respectively and the full discharge energies of the first battery cell 5 and the second battery cell 6 when standing at −20° C. are $E_1'$ and $E_2'$ respectively, where $1 \le E_1/E_2 \le 1.5$, and $0.95 \le E_1'/E_2' \le 1.67$, $E_1$, $E_2$, $E_1'$, and $E_2'$ being expressed in Wh.

In the present application, according to the magnitude of the temperature change rate K, the interior space of the battery pack cavity is divided into different regions, namely, a first region R1 with a temperature change rate of K1 and a second region R2 with a temperature change rate of K2, where 0.066° C./min≤K1≤0.131° C./min and 0.034° C./min≤K2≤0.066° C./min.

The first region R1 with a large temperature change rate has a lower temperature in a low temperature environment, and the proportion of the energy that can be released by the first battery cell 5 arranged in the first region R1 in a low temperature environment relative to that which can be released under normal temperature is lower.

The second region R2 with a small temperature change rate has a higher temperature in a low temperature environment, and the proportion of the energy that can be released by the second battery cell 6 arranged in the second region R2 in a low temperature environment relative to that can be released at normal temperature is higher than that of the first battery cell arranged in the first region.

The first region R1 with a large temperature change rate is usually the outermost region in the interior space of the battery pack cavity, and the second region with a small temperature change rate is usually a region that is located at the inner side in the interior space of the battery pack cavity relative to the first region.

In the present application, the temperature change rate K in the interior space of the battery pack cavity is measured by the following method.

Temperature change rate test of battery pack:

A Jufu walk-in high and low temperature box (IWER-A2-40-TP-AR) is used. The battery pack is placed in the high and low temperature box at normal temperature, and then an ambient temperature sampling point are set 10 cm above the top cover of the battery pack, and temperature sensors are arranged at the grid intersections according to a space grid of 10 cm×10 cm inside the battery pack, the distance between the temperature sensor and the bottom of the battery pack being half the distance from the bottom of the battery pack to the upper cover. The temperature sensor can be suspended by wires, or can be supported by thermally poor conductors such as paper shells.

A high and low temperature box is set to decrease from room temperature (25° C.) to 0° C., and the cooling rate of an ambient temperature sampling sensor is set to 0.205° C./min. At this time, a built-in temperature sensor detects the cooling rate throughout the battery pack, the time (unit: min) during which the temperature decreases from room temperature to 0° C. at each location is measured, and an average cooling rate from room temperature to 0° C. at each location is taken as the temperature change rate at that location (unit: ° C./min).

In the present application, the full discharge energy of the battery cell when standing at 25° C. and the full discharge energy when standing at −20° C. are measured by a Xinwei power battery tester (model BTS-5V300A-4CH) using the following method.

Measurement of full discharge energy when standing at room temperature 25° C.:

The battery cell is allowed to stand in an environment at 25° C. for 120 min, and then charged to a rated upper limit voltage of the battery cell with a constant current and constant voltage at a charging current of 60 A, with a charging cut-off current of 5 A. It is allowed to stand for 30 min. Then, the battery is discharged to a rated lower limit voltage of the battery cell with a constant current at a current of 60 A. At this time, the released energy displayed by the tester is the full discharge energy (unit: Wh) of the battery cell when standing at 25° C.

Measurement of full discharge energy when standing at low temperature −20° C.:

The above-mentioned battery cell fully charged at 25° C. is placed in an environment of −20° C., is allowed to stand for 120 min, and discharged to a rated lower limit voltage of the battery cell with a constant current at a current of 60 A. After discharging is stopped, it is allowed to stand for 30 min. At this time, the released energy displayed by the tester is the full discharge energy (unit: Wh) of the battery cell when standing at −20° C.

Hereafter, sometimes, the ratio (%) of the full discharge energy when the battery cell is left standing at −20° C. relative to the full discharge energy when standing at 25° C. is called the low temperature energy retention rate (or low temperature capacity retention rate) of the battery cell, and the ratio (%) of the full discharge energy of the entire battery pack when standing at −20° C. to the full discharge energy when standing at 25° C. is called the total energy retention rate of the battery pack at −20° C. (or total capacity retention rate of the battery pack at −20° C.).

The inventors have studied the relationship between the temperature change rate of the region where the battery cell is located and the low temperature energy retention rate of the battery cell. It is found that when the temperature change rate (cooling rate) of a certain region reaches or exceeds 0.066° C./min, the low temperature energy retention rate of the battery cell in this region during the same period is significantly smaller than the low temperature energy retention rate of the battery cell in a region with a small temperature change rate in the battery pack, and the overall low temperature energy retention rate of the battery pack is significantly reduced due to the cask effect. Here, the temperature change rate of a certain region refers to the average temperature change rate when the temperature of the region decreases from room temperature 25° C. to 0° C.

Therefore, in order to avoid a significant decrease in the overall low-temperature energy retention rate of the battery pack due to the cask effect, it is conceivable that an ordinary battery cell (i.e., second battery cell 6) is arranged in a region with a temperature change rate of less than 0.066° C./min (i.e., second region R2), and a battery cell (i.e., first battery cell 5) with better low-temperature performance (i.e., higher energy released at low temperature) is arranged in a region with a temperature change rate of 0.066° C./min or more (i.e., first region R1).

In addition, for the above-mentioned first region R1 and second region R2, multiple locations are selected respectively, and the value of the temperature change rate K is measured by the above measurement method, and the upper limit of the temperature change rate of the first region R1 is obtained as 0.131° C./min, and the lower limit of the temperature change rate of the second region R2 is 0.034° C./min. Therefore, it is determined that the temperature change rate K1 of the first region R1 is in the range of $0.066 \leq K1 \leq 0.131$, and the temperature change rate of the second region R2 is $0.034 \leq K2 < 0.066$, where the unit is ° C./min.

The inventors have further conducted in-depth research on the relationship between $E_1$, $E_2$, $E_1'$ and $E_2'$ of the first battery cell 5 and the second battery cell 6 and the total energy retention rate of the battery pack at −20° C. It is found that when $E_1$ and $E_2$ of the first battery cell and the second battery cell satisfy the relationship of $1 < E_1/E_2 \leq 1.5$, and $E_1'$ and $E_2'$ of the first battery cell and the second battery cell satisfy $0.95 \leq E_1'/E_2' \leq 1.67$ (where the unit of $E_1$, $E_2$, $E_1'$ and $E_2$ is Wh), the energy that the first battery cell and the second battery cell can release at low temperature (discharge capacity at low temperature) is substantially identical, so that the cask effect of the battery pack can be avoided, the total energy retention rate of the battery pack at −20° C. is excellent, and the overall endurance level of the battery pack at low temperature is improved.

In some embodiments, $E_1$, $E_2$, $E_1'$ and $E_2'$ satisfy $1.05 \leq E_1/E_2 \leq 1.45$, and $0.97 \leq E_1'/E_2' \leq 1.41$.

By making $E_1/E_2$ and $\leq E_1'/E_2'$ in the above ranges, the energy released by the first battery cell 5 and the second battery cell 6 at low temperature can be made closer to each other, the deviation of energy released by all battery cells in the battery pack 1 at low temperature is smaller, and the low-temperature energy retention rate of the battery pack 1 as a whole is more excellent.

In some embodiments, $E_1'/E_1$ is 70% to 95% and $E_2'/E_2$ is 65% to 97%.

Thereby, the first battery cell 5 and the second battery cell 6 each have a relatively high low-temperature energy retention rate, and will not cause a cask effect that affects the overall energy exertion of the battery pack 1, and it is easy to maintain the excellent low temperature energy retention rate of the battery pack 1 as a whole.

In some embodiments, $E_1'/E_1$ is 74% to 90% and $E_2'/E_2$ is 70% to 85%.

Thereby, the first battery cell 5 and the second battery cell 6 each have a higher low-temperature energy retention rate, and the low-temperature energy retention rate of the first battery cell is higher than the low-temperature energy retention rate of the second battery cell, so that it is easy to keep the battery pack 1 with a more excellent low-temperature energy retention rate.

In some embodiments, the number of the first battery cells 5 in the first region R1 accounts for 10% or more of the total number of battery cells in the first region R1, optionally 30% or more, further optionally 50% or more, and more further optionally 80% or more.

Arranging the first battery cell 5 with better low-temperature performance in the first region R1 with a lower temperature in a low temperature environment is an important technical means to achieve the objective of the present application. If the ratio of the number of the first battery cells 5 in the first region R1 to the total number of battery cells in the first region R1 is less than 10%, the effect of the present application may not be obtained. Therefore, the lower limit of this ratio is set to 10%. On the other hand, the higher the ratio, the more excellent the effect of the present application. Therefore, only from the viewpoint of obtaining the effect of the present application, the ratio is preferably 30% or more, more preferably 50% or more, and further preferably 80% or more. However, the cost of the first battery cell 5 with better low-temperature performance also increases accordingly. Therefore, if the factor of cost is also considered, the upper limit of the ratio above can be set according to the balance between the low-temperature energy retention rate and the cost.

In some embodiments, the number of the second battery cells 6 in the second region R2 accounts for 50% or more of the total number of battery cells in the second region R2, further optionally 80% or more.

By allowing the number of the second battery cells 6 with ordinary low-temperature performance in the second region R2 to account for 50% or more of the total number of battery cells in the second region R2, reducing the number of first batteries in this region, it can avoid that the part of the energy of the first battery that exceeds the energy of the second battery at normal temperature cannot be exerted, resulting in a waste of energy density of the battery pack. At the same time, here, the greater the battery difference, the greater the difficulty of temperature monitoring and voltage equalization brought to the power management system, resulting in increased costs.

In some embodiments, as shown in FIG. 3, the first region R1 is located at the outermost side in the interior space of the battery pack cavity, and the second region R2 is located at the inner side in the battery pack cavity relative to the first region R1.

Usually, in the absence of other auxiliary heating means, the outermost region in the interior space of the battery pack cavity is equivalent to the first region R1, with large temperature change rate, and a region that is located at the inner side in the interior space of the battery pack cavity relative to the outermost region is equivalent to the second region R2, with small temperature change rate. The objective of the present application can be easily achieved by arranging the first battery cell 5 in the outermost region of the battery pack cavity and arranging the second battery cell 6 in the inner region thereof.

In some embodiments, the ratio of the volume of the first region R1 to the volume of the interior space of the battery pack cavity is 50% or less, optionally 40% or less, and further optionally 30% or less.

As described above, the first battery cell 5 in the first region R1 has better low-temperature performance but higher cost, and thus, by allowing the ratio of the volume of the first region R1 to the volume of the interior space of the battery pack cavity to be within an appropriate range, significant increase in cost due to use of the first battery cell 5 can be suppressed.

In some embodiments, the first battery cell 5 and the second battery cell 6 are battery cells of the same chemical system with the same positive electrode material, negative electrode material and electrolyte.

If the first battery cell 5 and the second battery cell 6 are battery cells of the same chemical system with the same positive electrode material, negative electrode material and electrolyte, the first battery cell 5 and the second battery cell 6 can be manufactured by adjusting the composition of at least one of the positive electrode material, the negative electrode material, and the electrolyte, and thus, the first battery cell 5 and the second battery cell 6 having different low-temperature performances can be easily manufactured.

In some embodiments, the first battery cell 5 and the second battery cell 6 are ternary batteries, lithium manganate batteries, lithium iron phosphate batteries, sodium ion batteries or lithium metal batteries.

The effects of the present application can be achieved as long as the first battery cell 5 and the second battery cell 6 in the battery pack 1 satisfy the range of the above-mentioned relationship of $E_1/E_2$ and $E_1'/E_2'$, and the battery cells in the battery pack 1 can are existing batteries, such as ternary batteries, lithium manganate batteries, lithium iron phosphate batteries, sodium ion batteries, or lithium metal batteries, or batteries other than these batteries. Within the range in which the above-mentioned relationship of $E_1/E_2$ and $E_1'/E_2'$ is satisfied, existing lithium-ion batteries can be used as the first battery cell 5 and the second battery cell 6, so that the first battery cell 5 and the second battery cell 6 have a high degree of freedom of selection.

In some embodiments, the first battery cell 5 and the second battery cell 6 are battery cells of different chemical systems in which at least one of a positive electrode material, a negative electrode material and an electrolyte is different.

Different chemical systems means that at least one of a positive electrode material, a negative electrode material and an electrolyte is different. By using battery cells of different chemical systems for the first battery cell 5 and the second battery cell 6, a battery pack can be manufactured by combining existing battery cells of different chemical systems, and the degree of freedom in manufacturing the battery pack is high.

In some embodiments, the positive electrode active material of the first battery cell 5 is different from the positive electrode active material of the second battery cell 6, and the gram capacity of the positive electrode active material of the first battery cell 5 is 1.2 to 1.5 times the gram capacity of the positive electrode active material of the second battery cell 6.

In the present application, the gram capacity of the positive electrode active material of the battery cell can be obtained by the following method.

Test Method for Gram Capacity:

In an environment of 25° C., the battery cell is charged to a rated upper limit voltage with constant current and constant voltage at 0.33 C, with a cut-off current of 0.05 C. After standing for 30 min, it is discharged to a rated lower limit voltage at 0.33 C, and the capacity released at this time is C1 (Ah). The positive electrode plate of the battery is taken out, the electrolyte solution on the electrode plate is rinsed with DMC, and then the active material on the electrode plate is scraped off. The electrode plate is placed in an oven at 60° C. for 12 hr, dried and then weighed to be n grams. Then the average capacity exertion of the battery is (C1×1000)/n, in mAh/g.

As described above, the capacity of the first battery cell 5 is greater than the capacity of the second battery cell 6, and if the positive electrode active material of the first battery cell 5 is the same as the positive electrode active material of the second battery cell 6, the volume of the first battery cell 5 may be larger than the volume of the second battery cell 6. By different positive electrode active materials being used for the first battery cell 5 and the second battery cell 6, and the gram capacity of the positive electrode active material of the first battery cell 5 being 1.2 to 1.5 times of the gram capacity of the positive electrode active material of the second battery cell 6, the capacity of the first battery cell 5 can be increased without significantly increasing the volume of the first battery cell 5, and the assembly of the battery pack 1 can be facilitated.

In some embodiments, the first battery cell 5 is a ternary battery, and the second battery cell 6 is a lithium manganate battery or a lithium iron phosphate battery.

Generally, a ternary battery has better low-temperature performance compared with a lithium manganate battery or a lithium iron phosphate battery, and thus, the first battery cell 5 can use a ternary battery, and the second battery cell 6 can use a lithium manganate battery or a lithium iron phosphate battery. Thereby, the battery pack 1 of the present application can be easily manufactured using existing battery cells.

Hereinafter, the battery cells (the first battery cell 5 and the second battery cell 6) used in the battery pack of the present application will be described in detail.

The battery cell used in the battery pack of the present application is a secondary battery. Typically, a secondary battery comprises a positive electrode plate, a negative electrode plate, an electrolyte, and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode film layer provided on at least one surface of the positive electrode current collector, the positive electrode film layer comprising a positive electrode active material.

As examples, the positive electrode current collector has two surfaces opposite in its own thickness direction, and the positive electrode film layer is provided on either or both of the two opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, aluminum alloys, nickel, nickel alloys, titanium, titanium alloys, silver and silver alloys, etc.) on a polymer material base layer (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may include at least one of the following materials: lithium-containing phosphates of olivine structure, lithium transition metal oxides and their respective modified compounds. However, the present application is not limited to these materials, and other conventional materials that can be used as positive electrode active materials for batteries can also be used. These positive electrode active materials may be used alone or in combination of two or more. Among them, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $Li Mn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer may optionally comprise a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above-mentioned components for preparing the positive electrode plate, such as positive electrode active material, conductive agent, binder and any other components, are dispersed in a solvent (e.g. N-methylpyrrolidone) to form a positive electrode slurry; and the positive electrode slurry is coated onto a positive electrode current collector, and is then subjected to procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As examples, the negative electrode current collector has two surfaces opposite in its own thickness direction, and the negative electrode film layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming metal materials (copper, copper alloys, nickel, nickel alloys, titanium, titanium alloys, silver and silver alloys, etc.) on the polymer material base layer (such as polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: the above-mentioned components for preparing the negative electrode plate, such as negative electrode active material, conductive agent, binder and any other components, are dispersed in a solvent (e.g. deionized water) to form a negative electrode slurry; and the negative electrode slurry is coated onto a negative electrode current collector, and is then subjected to procedures such as drying and cold pressing, so as to obtain the negative electrode plate.

[Electrolyte]

The electrolyte is located between the positive electrode plate and the negative electrode plate and functions for ionic conduction. There is no specific limitation on the type of the electrolyte in the present application, and the electrolyte can be selected according to the requirements. For example, the electrolyte may be liquid, gel or all solid.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally comprise an additive. For example, the additive can include a negative electrode film-forming additive, a positive electrode film-forming additive, and also an additive that can improve certain performances of the battery, such as an additive that improve the overcharge performance of the battery, or an additive that improve the high temperature performance or low-temperature performance of the battery.

[Separator]

In some embodiments, the secondary battery further comprises a separator. The type of the separator is not particularly limited in the present application, and any well known porous-structure separator with good chemical stability and mechanical stability can be selected.

In some embodiments, the material of the separator can be selected from at least one of glass fibers, a non-woven, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a laminating process.

In some embodiments, the secondary battery may comprise an outer package. The outer package is used to encapsulate the above electrode assembly and electrolyte.

In some embodiments, the outer package of the secondary battery can be a hard shell, for example, a hard plastic shell, an aluminum shell, a steel shell, etc. The outer package of the secondary battery can also be a soft bag, such as a pouch-type soft bag. The material of the soft package may be plastics, and the examples of plastics may include polypropylene, polybutylene terephthalate, and polybutylene succinate, etc.

Figure 4:
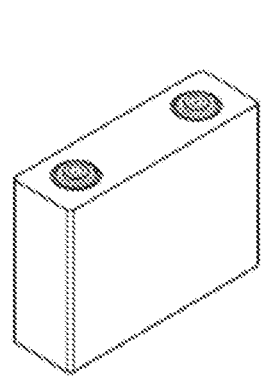
FIG. 4 is a schematic diagram of a battery cell (secondary battery) in an embodiment of the present application.

The shape of the battery cell (secondary battery) is not particularly limited in the present application, and may be cylindrical, square or of any other shape. For example, FIG. 4 is a first battery cell 5 of a square structure as an example (here, the first battery cell 5 is taken as an example for description, and the same is true for the second battery cell 6).

Figure 5:
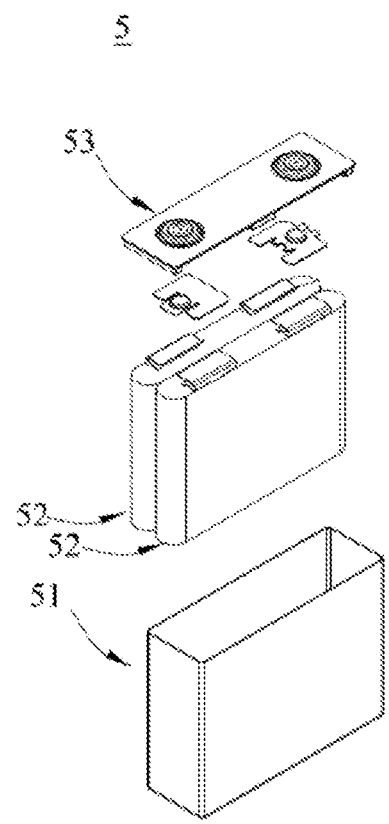
FIG. 5 is an exploded view of the battery cell shown in FIG. 4 in an embodiment of the present application.

In some embodiments, referring to FIG. 5, the outer package may comprise a housing 51 and a cover plate 53. wherein the housing 51 may comprise a bottom plate and side plates connected to the bottom plate, and the bottom plate and the side plates enclose and form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is encapsulated in the accommodating cavity. The electrolyte solution is infiltrated into the electrode assembly 52. The number of the electrode assemblies 52 contained in the first battery cell 5 may be one or more, and may be selected by those skilled in the art according to actual requirements.

In some embodiments, at least one first battery cell 5 and at least one second battery cell 6 can be assembled into a battery pack 1, and the specific numbers of the first battery cells 5 and the second battery cells 6 contained in the battery pack 1 can be selected according to the application and capacity of the battery pack.

[Power Consuming Device]

In addition, the present application also provides an power consuming device comprising the battery pack of the present application. The battery pack may be used as a power supply of the power consuming device, or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but are not limited thereto.

As a power consuming device, the battery cell or battery pack can be selected according to the usage requirements thereof.

Figure 6:
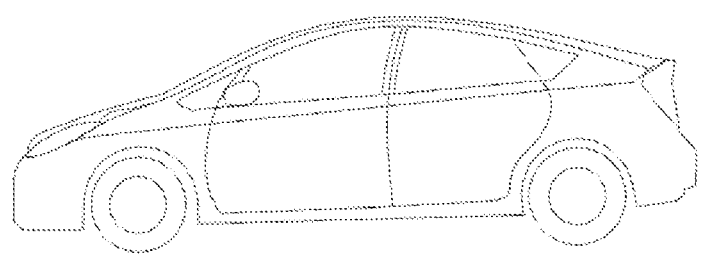
FIG. 6 is a schematic diagram of a power consuming device using a battery pack according to an embodiment of the present application as a power supply.

FIG. 6 shows a power consuming device as an example. The power consuming device may be a pure electric vehicle, a hybrid electric vehicle, a plug-in hybrid electric vehicle or the like. In order to meet the requirement of the power consuming device for endurance at low temperature, the battery pack of the present application can be used.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

(1) Preparation of Battery Cell

I. Preparation of First Battery Cell

Preparation Example I-1

1) Preparation of Positive Electrode Plate

A positive active material $LiNi_{0.55}Co_{0.05}Mn_{0.4}O_2$, superconducting carbon black SP as a conductive agent and polyvinylidene fluoride (PVDF) as a binder were dispersed in N-methylpyrrolidone (NMP) as a solvent in a mass ratio of 96:1.2:2.8 and mixed uniformly to obtain a positive electrode slurry; and the positive electrode slurry was evenly coated onto a positive electrode current collector aluminum foil, and was subjected to drying, cold pressing, slitting and cutting, so as to obtain the positive electrode plate.

2) Preparation of Negative Electrode Plate

A negative electrode active material graphite, superconducting carbon black SP as a conductive agent, SBR as a binder, and CMC-Na as a thickener were dispersed in deionized water as a solvent in a mass ratio of 96:1:1:2 and mixed uniformly to obtain a negative electrode slurry; and the negative electrode slurry was evenly coated onto a negative electrode current collector copper foil, and was subjected to drying, cold pressing, slitting and cutting, so as to obtain the negative electrode plate.

3) Separator

Polyethylene film is selected as the isolation film.

4) Preparation of Electrolyte Solution

Ethylene carbonate (EC), dimethyl carbonate (DMC), and diethyl carbonate (DEC) are mixed in a volume ratio of 1:1:1 into an organic solvent, and then the fully dried lithium salt LiPF$_6$ was dissolved in the mixed organic solvent, so as to prepare an electrolyte solution with a concentration of 1 mol/L.

5) Preparation of Battery Cell

The above-mentioned positive electrode plate, separator, and negative electrode plate were stacked in sequence, such that the separator is located between the positive electrode plate and the negative electrode plate to play a role of isolation, and then winding was performed to obtain a bare bell; and the bare cell was placed in an outer packaging case, dried and then injected with the electrolyte solution, and was subjected to procedures such as vacuum packaging, standing, forming and shaping, so as to obtain a first battery cell I-1.

Preparation Example I-2

A first battery cell I-2 was obtained in the same manner as in Preparation Example I-1, except that superconducting carbon black SP and carbon nanotube (CNT) were used as the conductive agent and the mass ratio of the positive electrode active material, superconducting carbon black SP, carbon nanotubes and binder was 96:2.1:0.2:1.7.

Preparation Example I-3

A first battery cell I-3 was obtained in the same manner as in Preparation Example I-1, except that superconducting carbon black SP and carbon nanotube (CNT) were used as the conductive agent and the mass ratio of the positive electrode active material, superconducting carbon black SP, carbon nanotubes and binder was 96:1.5:0.8:1.7.

Preparation Example I-4

A first battery cell I-4 was obtained in the same manner as in Preparation Example I-1, except that LiNi$_{0.55}$Co$_{0.12}$Mn$_{0.4}$O$_2$ was used as positive electrode active material, superconducting carbon black SP and graphene were used as the conductive agent and the mass ratio of the positive electrode active material, superconducting carbon black SP, graphene and binder was 96:1:1:2.

Preparation Example I-5

A first battery cell I-5 was obtained in the same manner as in Preparation Example I-1, except that LiNi$_{0.55}$Co$_{0.12}$Mn$_{0.4}$O$_2$ was used as positive electrode active material, superconducting carbon black SP and graphene were used as the conductive agent and the mass ratio of the positive electrode active material, superconducting carbon black SP, graphene and binder was 96:1:0.4:2.6.

Preparation Example I-6

A first battery cell I-6 was obtained in the same manner as in Preparation Example I-1, except that the mass ratio of the positive electrode active material, superconducting carbon black SP and binder was 96:1.3:2.7.

Preparation Example I-7

A first battery cell I-7 was obtained in the same manner as in Preparation Example I-1, except that superconducting carbon black SP and carbon nanotube (CNT) were used as the conductive agent and the mass ratio of the positive electrode active material, superconducting carbon black SP, carbon nanotubes and binder was 96:1.3:1.0:1.7.

Preparation Example I-8

A first battery cell I-8 was obtained in the same manner as in Preparation Example I-1, except that LiNi$_{0.55}$Co$_{0.12}$Mn$_{0.4}$O$_2$ was used as positive electrode active material, superconducting carbon black SP and graphene were used as the conductive agent and the mass ratio of the positive electrode active material, superconducting carbon black SP, graphene and binder was 96:1:0.9:2.1.

Preparation Example I-9

A first battery cell I-9 was obtained in the same manner as in Preparation Example I-1, except that the mass ratio of the positive electrode active material, superconducting carbon black SP and binder was 96:1:3.

Preparation Example I-10

A first battery cell I-10 was obtained in the same manner as in Preparation Example I-1, except that the mass ratio of the positive electrode active material, superconducting carbon black SP and binder was 96:1.1:2.9.

Preparation Example I-11

A first battery cell I-11 was obtained in the same manner as in Preparation Example I-1, except that the mass ratio of the positive electrode active material, superconducting carbon black SP and binder was 96:1.4:2.6.

II. Preparation of Second Battery Cell

Preparation Example II-1

A second battery cell II-1 was obtained in the same manner as in Preparation Example I-1, except that lithium iron phosphate (LFP) was used as the positive electrode active material and the mass ratio of the positive electrode active material, superconducting carbon black SP and binder was 96:1.5:2.5.

Preparation Example II-2

A second battery cell I-2 was obtained in the same manner as in Preparation Example I-1, except that lithium iron phosphate (LFP) was used as the positive electrode active material and the mass ratio of the positive electrode active material, superconducting carbon black SP and binder was 96:1.2:2.8.

Preparation Example II-3

A second battery cell II-3 was obtained in the same manner as in Preparation Example I-1, except that lithium iron phosphate (LFP) was used as the positive electrode active material and the mass ratio of the positive electrode active material, superconducting carbon black SP and binder was 96:1.6:2.4.

Preparation Example II-4

A second battery cell II-4 was obtained in the same manner as in Preparation Example I-1, except that Na$_3$V$_2$ (PO$_4$)$_2$O$_2$F was used as the positive electrode active material, carbon nanotubes (CNT) were used as the conductive agent and the mass ratio of the positive electrode active material, carbon nanotubes and binder was 96:2.2:1.8.

Preparation Example II-5

A second battery cell II-5 was obtained in the same manner as in Preparation Example I-1, except that lithium iron phosphate (LFP) was used as the positive electrode active material, superconducting carbon black SP and carbon nanotube (CNT) were used as the conductive agent and the mass ratio of the positive electrode active material, superconducting carbon black SP, carbon nanotubes and binder was 96:1:1.3:1.7.

Preparation Example II-6

A second battery cell II-6 was obtained in the same manner as in Preparation Example I-1, except that lithium iron phosphate (LFP) was used as the positive electrode active material, superconducting carbon black SP and carbon nanotube (CNT) were used as the conductive agent and the mass ratio of the positive electrode active material, superconducting carbon black SP, carbon nanotubes and binder was 96:1:1:2.

Preparation Example II-7

A second battery cell II-7 was obtained in the same manner as in Preparation Example I-1, except that LiMn$_2$O$_4$ was used as the positive electrode active material, superconducting carbon black SP and carbon nanotube (CNT) were used as the conductive agent and the mass ratio of the positive electrode active material, superconducting carbon black SP, carbon nanotubes and binder was 96:1:0.8:2.2.

Preparation Example II-8

A second battery cell II-7 was obtained in the same manner as in Preparation Example I-1, except that LiMn$_2$O$_4$ was used as the positive electrode active material and the mass ratio of the positive electrode active material, superconducting carbon black SP and binder was 96:1.8:2.2.

Preparation Example II-9

A second battery cell II-9 was obtained in the same manner as in Preparation Example I-1, except that lithium iron phosphate (LFP) was used as the positive electrode active material and the mass ratio of the positive electrode active material, superconducting carbon black SP and binder was 96:0.5:3.5.

Preparation Example II-10

A second battery cell II-10 was obtained in the same manner as in Preparation Example I-1, except that lithium iron phosphate (LFP) was used as the positive electrode active material, superconducting carbon black SP and carbon nanotube (CNT) were used as the conductive agent and the mass ratio of the positive electrode active material, superconducting carbon black SP, carbon nanotubes and binder was 96:1:0.9:2.1.

Preparation Example II-11

A second battery cell II-11 was obtained in the same manner as in Preparation Example I-1, except that lithium iron phosphate (LFP) was used as the positive electrode active material, superconducting carbon black SP and carbon nanotube (CNT) were used as the conductive agent and the mass ratio of the positive electrode active material, superconducting carbon black SP, carbon nanotubes and binder was 96:1:0.8:2.2.

(2) Packaging of Battery Pack

Example 1

The first battery cell I-1 was arranged in a first region R1, and the second battery cell II-1 was arranged in a second region R2, and a battery pack was assembled.

The number of the first battery cells I-1 in the first region R1 accounted for 100% of the total number of battery cells in the first region R1, and the number of the second battery cells II-1 in the second region R2 accounted for 100% of the total number of battery cells in the second region R2.

Example 2

A battery pack was assembled in the same manner as in Example 1, except that the first battery cell I-2 was used in place of the first battery cell I-1.

Example 3

A battery pack was assembled in the same manner as in Example 1, except that the first battery cell I-3 was used in place of the first battery cell I-1. Example 4

A battery pack was assembled in the same manner as in Example 1, except that the first battery cell I-4 was used in place of the first battery cell I-1.

Example 5

A battery pack was assembled in the same manner as in Example 1, except that the first battery cell I-5 was used in place of the first battery cell I-1.

Example 6

A battery pack was assembled in the same manner as in Example 1, except that the first battery cell I-3 was used in place of the first battery cell I-1 and the second battery cell II-8 was used in place of the second battery cell II-1.

Example 7

A battery pack was assembled in the same manner as in Example 1, except that the first battery cell I-6 was used in place of the first battery cell I-1 and the second battery cell II-2 was used in place of the second battery cell II-1.

Example 8

A battery pack was assembled in the same manner as in Example 1, except that the first battery cell I-7 was used in place of the first battery cell I-1 and the second battery cell II-4 was used in place of the second battery cell II-1.

Example 9

A battery pack was assembled in the same manner as in Example 1, except that the first battery cell I-8 was used in place of the first battery cell I-1 and the second battery cell II-5 was used in place of the second battery cell II-1.

Example 10

A battery pack was assembled in the same manner as in Example 1, except that the first battery cell II-4 was used in place of the first battery cell I-1 and the second battery cell II-6 was used in place of the second battery cell II-1.

Example 11

A battery pack was assembled in the same manner as in Example 1, except that the first battery cell I-6 was used in place of the first battery cell I-1 and the second battery cell II-7 was used in place of the second battery cell II-1.

Example 12

A battery pack was assembled in the same manner as in Example 1, except that the first battery cell I-2 was used in place of the first battery cell I-1, the second battery cell II-3 was used in place of the second battery cell II-1, and the number of the first battery cells I-2 in the first region R1 accounted for 10% of the total number of battery cells in the first region R1 (the remaining 90% of the battery cells in the first region R1 were the second battery cells II-3).

Example 13

A battery pack was assembled in the same manner as in Example 12, except that the number of the first battery cells I-2 in the first region R1 accounted for 30% of the total number of battery cells in the first region R1 (the remaining 70% of the battery cells in the first region R1 were the second battery cells II-3).

Example 14

A battery pack was assembled in the same manner as in Example 12, except that the number of the first battery cells I-2 in the first region R1 accounted for 40% of the total number of battery cells in the first region R1 (the remaining 60% of the battery cells in the first region R1 were the second battery cells II-3).

Example 15

A battery pack was assembled in the same manner as in Example 12, except that the number of the first battery cells I-2 in the first region R1 accounted for 60% of the total number of battery cells in the first region R1 (the remaining 40% of the battery cells in the first region R1 were the second battery cells II-3).

Example 16

A battery pack was assembled in the same manner as in Example 12, except that the number of the first battery cells I-2 in the first region R1 accounted for 80% of the total number of battery cells in the first region R1 (the remaining 20% of the battery cells in the first region R1 were the second battery cells II-3).

Example 17

A battery pack was assembled in the same manner as in Example 12, except that the number of the first battery cells I-2 in the first region R1 accounted for 100% of the total number of battery cells in the first region R1.

Comparative Example 1

A battery pack was assembled in the same manner as in Example 1, except that the first battery cell I-9 was used in place of the first battery cell I-1.

Comparative Example 2

A battery pack was assembled in the same manner as in Example 1, except that the first battery cell I-11 was used in place of the first battery cell I-1 and the second battery cell II-10 was used in place of the second battery cell II-1.

Comparative Example 3

A battery pack was assembled in the same manner as in Example 1, except that the first battery cell I-10 was used in place of the first battery cell I-1 and the second battery cell II-11 was used in place of the second battery cell II-1.

Comparative Example 4

A battery pack was assembled in the same manner as in Example 1, except that the first battery cell I-5 was used in place of the first battery cell I-1 and the second battery cell II-9 was used in place of the second battery cell II-1.

Comparative Example 5

A battery pack was assembled in the same manner as in Example 12, except that the number of the first battery cells I-2 in the first region R1 accounted for 8% of the total number of battery cells in the first region R1 (the remaining 92% of the battery cells in the first region R1 were the second battery cells II-3).

(3) Performance Test Results of Battery Cell and Battery Pack

1. Performance Test Results of Battery Cell

Various performance parameters of the first battery cells I-1 to I-11 were measured by the above method, and are shown in Table 1 together with the positive electrode compositions of the first battery cells I-1 to I-11.

TABLE 1

Positive electrode composition and performance parameters of first battery cell

| First battery cell | Positive electrode active material | Conductive agent | Conductive agent content | Coating weight per unit area (g/1540.25 mm$^2$) | Gram capacity (mAh/g) | $E_1$ (Wh) | $E_1'$ (Wh) | $E_1'/E_1$ |
|---|---|---|---|---|---|---|---|---|
| I-1  | $LiNi_{0.55}Co_{0.05}Mn_{0.4}O_2$ | SP | 1.20% | 0.24 | 182 | 735.00 | 551.25 | 75% |
| I-2  | $LiNi_{0.55}Co_{0.05}Mn_{0.4}O_2$ | SP + CNT | 2.1% + 0.2% | 0.24 | 185 | 859.00 | 695.79 | 81% |
| I-3  | $LiNi_{0.55}Co_{0.05}Mn_{0.4}O_2$ | SP + CNT | 1.5% + 0.8% | 0.24 | 186 | 891.00 | 801.9 | 90% |
| I-4  | $LiNi_{0.55}Co_{0.12}Mn_{0.4}O_2$ | SP + graphene | 1% + 1% | 0.24 | 188 | 891.00 | 722.601 | 81% |
| I-5  | $LiNi_{0.55}Co_{0.12}Mn_{0.4}O_2$ | SP + graphene | 1% + 0.4% | 0.24 | 188 | 981 | 726.921 | 74% |
| I-6  | $LiNi_{0.55}Co_{0.05}Mn_{0.4}O_2$ | SP | 1.30% | 0.24 | 182 | 766.00 | 589.82 | 77% |
| I-7  | $LiNi_{0.55}Co_{0.05}Mn_{0.4}O_2$ | SP + CNT | 1.3% + 1.0% | 0.24 | 186 | 891.00 | 819.72 | 92% |
| I-8  | $LiNi_{0.55}Co_{0.12}Mn_{0.4}O_2$ | SP + graphene | 1% + 0.9% | 0.24 | 188 | 900.00 | 721.8 | 80% |
| I-9  | $LiNi_{0.55}Co_{0.05}Mn_{0.4}O_2$ | SP | 1.00% | 0.24 | 182 | 685.00 | 493.2 | 72% |
| I-10 | $LiNi_{0.55}Co_{0.05}Mn_{0.4}O_2$ | SP | 1.10% | 0.24 | 182 | 697.00 | 508.81 | 73% |
| I-11 | $LiNi_{0.55}Co_{0.05}Mn_{0.4}O_2$ | SP | 1.40% | 0.24 | 182 | 821.00 | 648.59 | 79% |

In addition, various performance parameters of the second battery cells II-1 to II-11 were measured using the above method, and are shown in Table 2 together with the positive electrode compositions of the second battery cells II-1 to II-11.

TABLE 2

Positive electrode composition and performance parameters of second battery cell

| Second battery cell | Positive electrode active material | Conductive agent | Conductive agent content | Coating weight per unit area (g/1540.25 mm$^2$) | Gram capacity (mAh/g) | $E_2$ (Wh) | $E_2'$ (Wh) | $E_2'/E_2$ |
|---|---|---|---|---|---|---|---|---|
| II-1  | LFP | SP | 1.50% | 0.35 | 140 | 676 | 567.84 | 84% |
| II-2  | LFP | SP | 1.20% | 0.35 | 140 | 676 | 534.04 | 79% |
| II-3  | LFP | SP | 1.60% | 0.35 | 140 | 676 | 581.36 | 86% |
| II-4  | $Na_3V_2(PO_4)_2O_2F$ | CNT | 2.20% | 0.35 | 142 | 676 | 615.16 | 91% |
| II-5  | LFP | SP + CNT | 1% + 1.3% | 0.35 | 145 | 693 | 626 | 90% |
| II-6  | LFP | SP + CNT | 1% + 1% | 0.35 | 145 | 664 | 630 | 95% |
| II-7  | $LiMn_2O_4$ | SP + CNT | 1% + 0.8% | 0.4 | 125 | 686 | 583.1 | 85% |
| II-8  | $LiMn_2O_4$ | SP | 1.80% | 0.4 | 120 | 676 | 567.84 | 84% |
| II-9  | LFP | SP | 0.50% | 0.35 | 140 | 627 | 407.55 | 65% |
| II-10 | LFP | SP + CNT | 1% + 0.9% | 0.35 | 145 | 858 | 627 | 73% |
| II-11 | LFP | SP + CNT | 1% + 0.8% | 0.35 | 145 | 891 | 625 | 70% |

2. Performance Test Results of Battery Pack

For the battery packs of Examples 1 to 17 and Comparative Examples 1 to 5, total discharge energies (KWh) at −20° C. were respectively measured by a Xinwei power battery tester (model BTS-5V300A-4CH), and the total discharge energy (KWh) at −20° C. was divided by the total discharge energy of the battery pack at 25° C., so as to calculate the total energy retention rate (%) of the battery pack at −20° C.

The total discharge energy (KWh) at −20° C. and total energy retention rate (%) at −20° C. of the battery packs of Examples 1 to 17 and Comparative Examples 1 to 5 are shown in Table 3 and Table 4 together with the first battery cell and the second battery cell used in each battery pack and their relevant parameters.

TABLE 3

Composition and performance parameters of battery packs of examples and comparative examples

| Battery pack | First battery cell | Second battery cell | $E_1$ (Wh) | $E_2$ (Wh) | $E_1'$ (Wh) | $E_2'$ (Wh) | $E_1/E_2$ | $E_1'/E_2'$ | Total discharge energy of battery pack at −20° C. (KWh) | Total energy retention rate of battery pack at −20° C. |
|---|---|---|---|---|---|---|---|---|---|---|
| Example 1 | I-1 | II-1 | 735 | 676 | 551.25 | 568 | 1.09 | 0.97 | 63.00 | 84% |
| Example 2 | I-2 | II-1 | 859 | 676 | 695.79 | 568 | 1.27 | 1.23 | 64.82 | 86% |

TABLE 3-continued

Composition and performance parameters of battery packs of examples and comparative examples

| Battery pack | First battery cell | Second battery cell | $E_1$ (Wh) | $E_2$ (Wh) | $E_1'$ (Wh) | $E_2'$ (Wh) | $E_1/E_2$ | $E_1'/E_2'$ | Total discharge energy of battery pack at −20° C. (KWh) | Total energy retention rate of battery pack at −20° C. |
|---|---|---|---|---|---|---|---|---|---|---|
| Example 3 | I-3 | II-1 | 891 | 676 | 801.9 | 568 | 1.32 | 1.41 | 69.29 | 92% |
| Example 4 | I-4 | II-1 | 891 | 676 | 722.601 | 568 | 1.32 | 1.27 | 66.75 | 89% |
| Example 5 | I-5 | II-1 | 981 | 676 | 726.921 | 568 | 1.45 | 1.28 | 65.25 | 87% |
| Example 6 | I-3 | II-8 | 891 | 676 | 801.9 | 568 | 1.32 | 1.41 | 66.75 | 89% |
| Example 7 | I-6 | II-2 | 766 | 676 | 589.82 | 534 | 1.13 | 1.1 | 61.7 | 82.3% |
| Example 8 | I-7 | II-4 | 891 | 676 | 819.72 | 615.16 | 1.32 | 1.33 | 63.5 | 84.7% |
| Example 9 | I-8 | II-5 | 900 | 693 | 721.8 | 626 | 1.30 | 1.15 | 67.9 | 90.5% |
| Example 10 | II-4 | II-6 | 676 | 664 | 615.16 | 630 | 1.02 | 0.98 | 65.4 | 87.2% |
| Example 11 | I-6 | II-7 | 766 | 686 | 589.82 | 583.1 | 1.12 | 1.01 | 67.1 | 89.4% |
| Comparative example 1 | I-1 | II-11 | 685 | 676 | 493.2 | 568 | 1.01 | 0.87 | 54.75 | 73% |
| Comparative example 2 | I-5 | II-24 | 821 | 858 | 648.59 | 627 | 0.96 | 1.03 | 56.25 | 75% |
| Comparative example 3 | I-2 | II-25 | 697 | 891 | 508.81 | 625 | 0.78 | 0.81 | 51.75 | 69% |
| Comparative example 4 | I-24 | II-1 | 981 | 627 | 726.921 | 408 | 1.56 | 1.78 | 48.75 | 65% |

TABLE 4

Relationship between the proportion by number of first battery cells in first region and low-temperature performance of battery pack

| Battery pack | First battery cell | Proportion by number of first battery cell | Second battery cell | Proportion by number of second battery cell | $E_1/E_2$ | $E_1'/E_2'$ | Total discharge energy of battery pack at −20° C. (KWh) | Total energy retention rate of battery pack at −20° C. |
|---|---|---|---|---|---|---|---|---|
| Example 12 | I-2 | 10% | II-3 | 100% | 1.27 | 1.20 | 61.7 | 82.3% |
| Example 13 | I-2 | 30% | II-3 | 100% | 1.27 | 1.20 | 63.5 | 84.7% |
| Example 14 | I-2 | 40% | II-3 | 100% | 1.27 | 1.20 | 63.9 | 85.3% |
| Example 15 | I-2 | 60% | II-3 | 100% | 1.27 | 1.20 | 65.4 | 87.2% |
| Example 16 | I-2 | 80% | II-3 | 100% | 1.27 | 1.20 | 67.6 | 90.2% |
| Example 17 | I-2 | 100% | II-3 | 100% | 1.27 | 1.20 | 67.9 | 90.5% |
| Comparative example 5 | I-2 | 8% | II-3 | 100% | 1.27 | 1.20 | 55.0 | 73.4% |

(4) Comparison of Test Results of Examples and Comparative Examples

According to the results in Table 3 above, it can be seen that in the case of dividing the interior space of the battery pack cavity into a first region with a temperature change rate of K1 (0.066≤K1≤0.131) and a second region with a temperature change rate of K2 (0.034≤K2≤0.066), in Examples 1 to 17 in which $1<E_1/E_2≤1.5$ and $0.95≤E_1'/E_2'≤1.67$ ($E_1$, $E_2$, $E_1'$ and $E_2'$ are expressed in Wh) are satisfied, the total energy retention rate of the battery pack at −20° C. reaches 82% or more, which has achieved excellent results.

In comparative examples 1 to 4, $E_1/E_2$ and $E_1'/E_2'$ do not satisfy the above relationship, and the total energy retention rate of the battery pack at −20° C. is only 65% to 75%, without no effective improvement.

In addition, according to the results in Table 4 above, it can be seen that when the ratio of the number of first battery cells in the first region to the total number of battery cells in the first region is 10% or more, the effect of the present application can be obtained, and the higher the proportion by number of the first battery cells, the higher the total energy retention rate of the battery pack at −20° C., and the more significant the effect of the present application is.

In Comparative Example 5, the proportion by number of first battery cells in the first region accounts for less than 10%, and the effect of the present application cannot be obtained.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also full within the scope of the present application.

What is claimed is:

1. A battery pack, comprising a battery pack cavity and a plurality of battery cells received in the battery pack cavity,
wherein an interior space of the battery pack cavity is divided into a first region with a temperature change rate of K1 and a second region with a temperature change rate of K2, where $0.066 \leq K1 \leq 0.131$ and $0.034 \leq K2 < 0.066$, K1 and K2 being expressed in C/min;
the plurality of battery cells comprise at least one first battery cell arranged in the first region and at least one second battery cell arranged in the second region; and
full discharge energies of the first battery cell and the second battery cell at 25° C. are $E_1$ and $E_2$ respectively, and full discharge energies of the first battery cell and the second battery cell at −20° C. are $E_1'$ and $E_2'$ respectively, where $1 < E_1/E_2 \leq 1.5$, and $0.95 \leq E_1'/E_2' \leq 1.67$, $E_1$, $E_2$, $E_1'$, and $E_2'$ being expressed in Wh.

2. The battery pack according to claim 1, wherein $1.05 \leq E_1/E_2 \leq 1.45$ and $0.97 \leq E_1'/E_2' \leq 1.41$.

3. The battery pack according to claim 1, wherein $E_1'/E_1$ is 70% to 95% and $E_2'/E_2$ is 65% to 97%.

4. The battery pack according to claim 3, wherein $E_1'/E_1$ is 74% to 90% and $E_2'/E_2$ is 70% to 85%.

5. The battery pack according to claim 1, wherein the number of the first battery cells in the first region accounts for 10% or more of the total number of battery cells in the first region.

6. The battery pack according to claim 1, wherein the number of the second battery cells in the second region accounts for 50% or more of the total number of battery cells in the second region.

7. The battery pack according to claim 1, wherein the first region is located at the outermost side in the interior space of the battery pack cavity, and the second region is located at the inner side in the battery pack cavity relative to the first region.

8. The battery pack according to claim 1, wherein the ratio of the volume of the first region to the volume of the interior space of the battery pack cavity is 50% or less.

9. The battery pack according to claim 1, wherein the first battery cell and the second battery cell are battery cells of the same chemical system with the same positive electrode material, negative electrode material and electrolyte.

10. The battery pack according to claim 9, wherein the first battery cell and the second battery cell are ternary batteries, lithium manganate batteries, lithium iron phosphate batteries, sodium ion batteries or lithium metal batteries.

11. The battery pack according to claim 1, wherein the first battery cell and the second battery cell are battery cells of different chemical systems in which at least one of a positive electrode material, a negative electrode material and an electrolyte is different.

12. The battery pack according to claim 11, wherein
the positive electrode active material of the first battery cell is different from the positive electrode active material of the second battery cell, and
the gram capacity of the positive electrode active material of the first battery cell is 1.2 to 1.5 times the gram capacity of the positive electrode active material of the second battery cell.

13. The battery pack according to claim 11, wherein the first battery cell is a ternary battery, and the second battery cell is a lithium manganate battery or a lithium iron phosphate battery.

14. A power consuming device, comprising a battery pack;
wherein the battery pack comprises a battery pack cavity and a plurality of battery cells received in the battery pack cavity;
an interior space of the battery pack cavity is divided into a first region with a temperature change rate of K1 and a second region with a temperature change rate of K2, where $0.066 \leq K1 \leq 0.131$ and $0.034 \leq K2 < 0.066$, K1 and K2 being expressed in ° C./min;
the plurality of battery cells comprise at least one first battery cell arranged in the first region and at least one second battery cell arranged in the second region; and
full discharge energies of the first battery cell and the second battery cell at 25° C. are $E_1$ and $E_2$ respectively, and full discharge energies of the first battery cell and the second battery cell at −20° C. are $E_1'$ and $E_2'$ respectively, where $1 < E_1/E_2 \leq 1.5$, and $0.95 \leq E_1'/E_2' \leq 1.67$, $E_1$, $E_2$, $E_1'$, and $E_2'$ being expressed in Wh.

* * * * *